United States Patent
Yamazaki et al.

[11] Patent Number: 5,883,747
[45] Date of Patent: Mar. 16, 1999

[54] RECORDING AND/OR REPRODUCING OPTICAL SYSTEM AND OBJECTIVE LENS FOR OPTICAL INFORMATION RECORDING MEDIUM

[75] Inventors: Hiroyuki Yamazaki; Katsuya Yagi, both of Hachioji, Japan

[73] Assignee: Konica Corporation, Tokyo, Japan

[21] Appl. No.: 885,763

[22] Filed: Jun. 30, 1997

[30] Foreign Application Priority Data

Jul. 10, 1996 [JP] Japan .................................. 8-180586

[51] Int. Cl.⁶ ........................................ G02B 3/02
[52] U.S. Cl. ........................................ 359/719; 369/112
[58] Field of Search .............................. 369/112; 359/719

[56] References Cited

U.S. PATENT DOCUMENTS

| | | | |
|---|---|---|---|
| 5,615,199 | 3/1997 | Tatsuno et al. | 369/112 |
| 5,684,641 | 11/1997 | Tanaka et al. | 359/719 |
| 5,790,506 | 8/1998 | Morita et al. | 369/118 |

FOREIGN PATENT DOCUMENTS

| | | |
|---|---|---|
| 0 537 904 A2 | 4/1993 | European Pat. Off. . |
| 7-302437 | 11/1995 | Japan . |
| WO 97/33277 | 9/1997 | WIPO . |

OTHER PUBLICATIONS

Patent Abstracts Of Japan, vol. 096, No. 003, Mar. 29, 1996 & JP 07 302437 A (Toshiba Corp.), Nov. 14, 1995.
Patent Abstracts Of Japan, vol. 095, No. 006, Jul. 31, 1995 & JP 07 057271 (Matsushita Electric Ind., Co., Ltd.), Mar. 3, 1995.
Patent Abstracts Of Japan, vol. 095, No. 007, Aug. 31, 1995 & JP 07 098431 A (Matsushita Electric Inc., Co., Ltd.), Apr. 11, 1995.

*Primary Examiner*—Georgia Epps
*Assistant Examiner*—Dawn-Marie Bey
*Attorney, Agent, or Firm*—Frishauf, Holtz, Goodman, Langer & Chick

[57] ABSTRACT

An apparatus for recording or reproducing information on an information recording surface of an optical information recording medium having a transparent substrate, includes a laser source to emit a light beam having a wavelength of $\lambda$ nm; and an objective lens to converge the light beam emitted from the laser source on the information recording surface of the optical information recording medium through the transparent substrate. When the light beam is converged through the transparent substrate of the optical information recording medium, a wavefront aberration of the objective lens has a curve which has a step at a numerical aperture (NA), and the following conditions are satisfied, $$W_1 - W_2 = m\lambda - \delta,$$

$$0 < \delta < 0.34\lambda$$

where $W_1$ represents a wavefront aberration at a point of the step when the curve is traced from a periphery toward an axis of the lens, $W_2$ represents a wavefront aberration at the point of the step when the curve is traced from the axis toward the periphery of the lens, m represents an integer including zero, and $|m| \leq 10$ is satisfied.

20 Claims, 17 Drawing Sheets

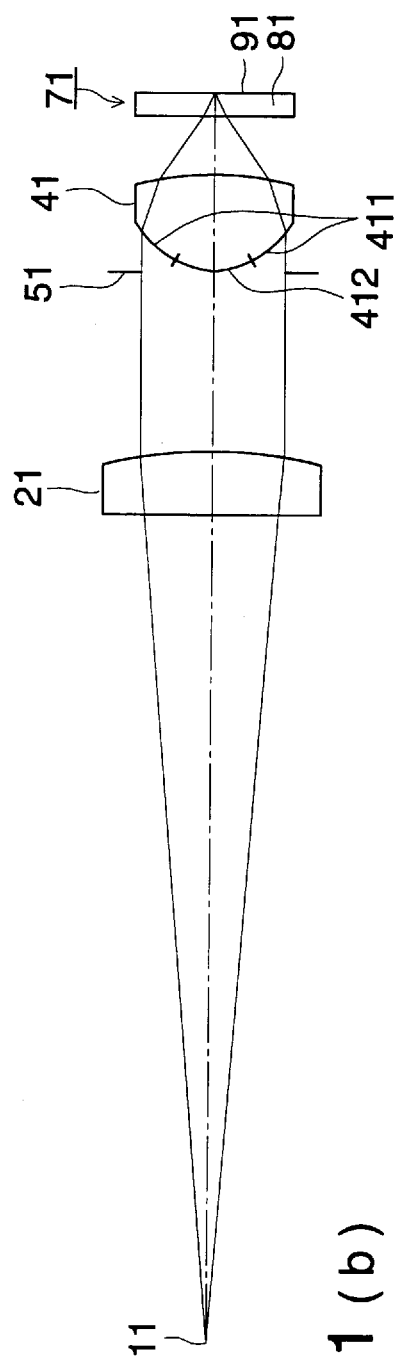
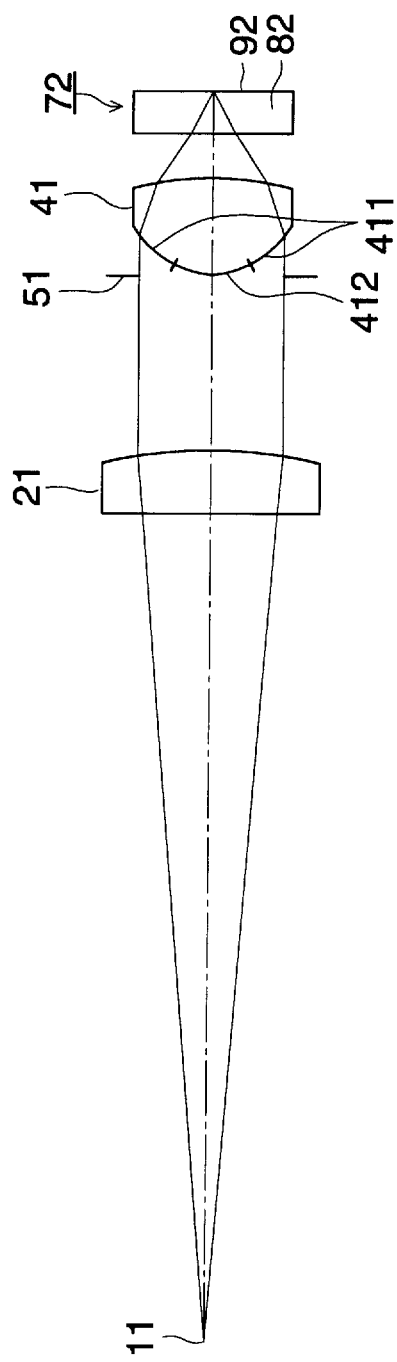
FIG. 1(a)
FIG. 1(b)

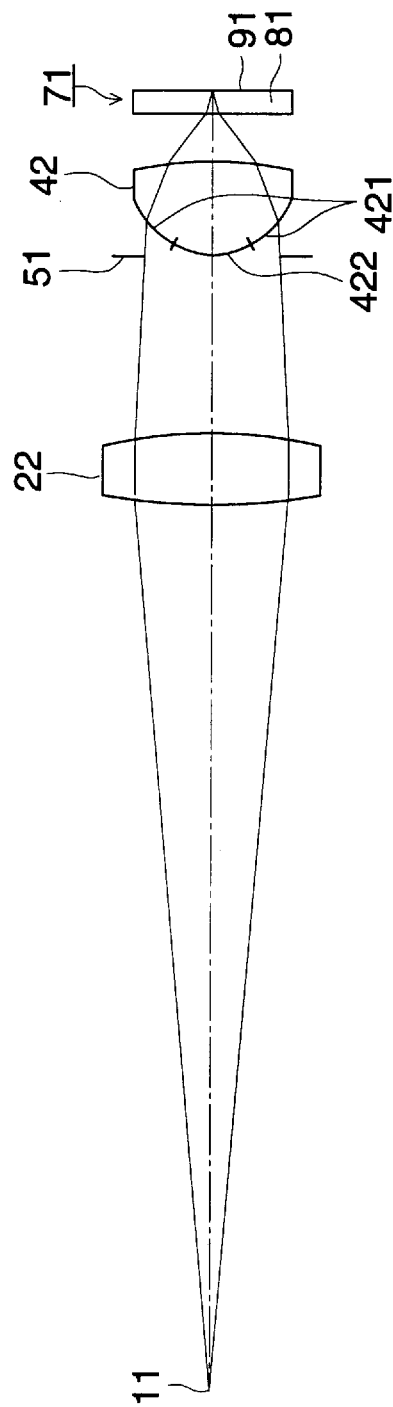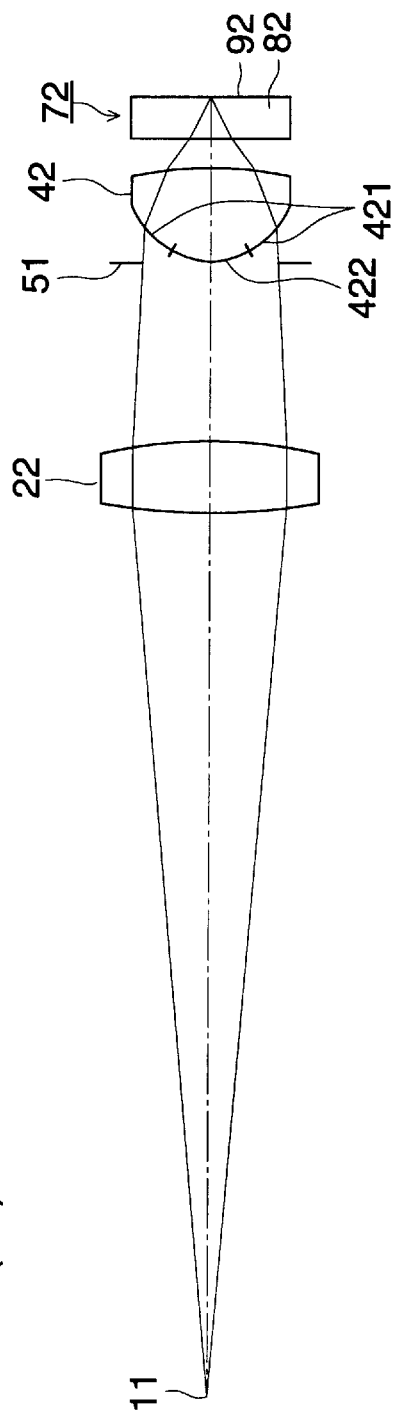
FIG. 5 (a)
FIG. 5 (b)

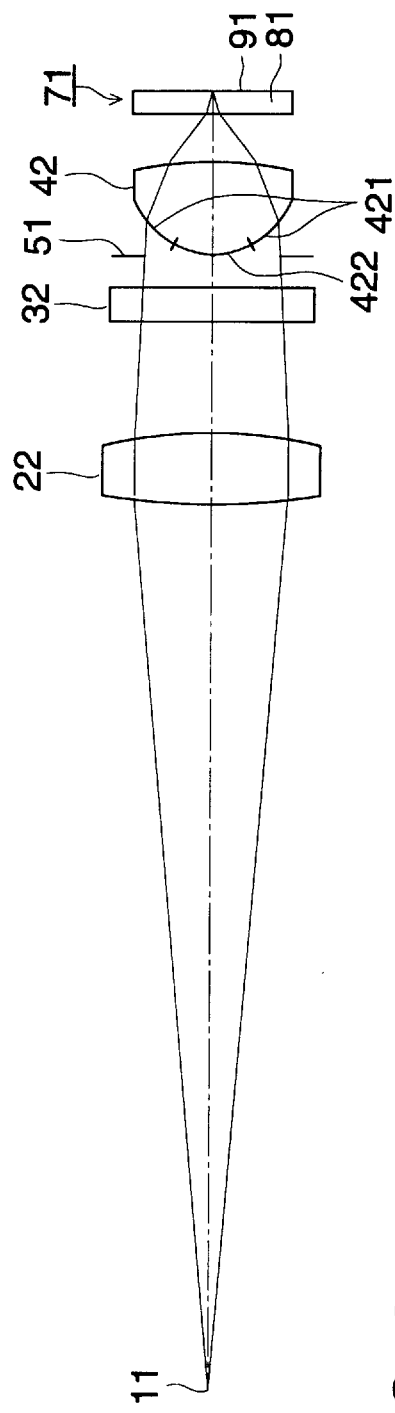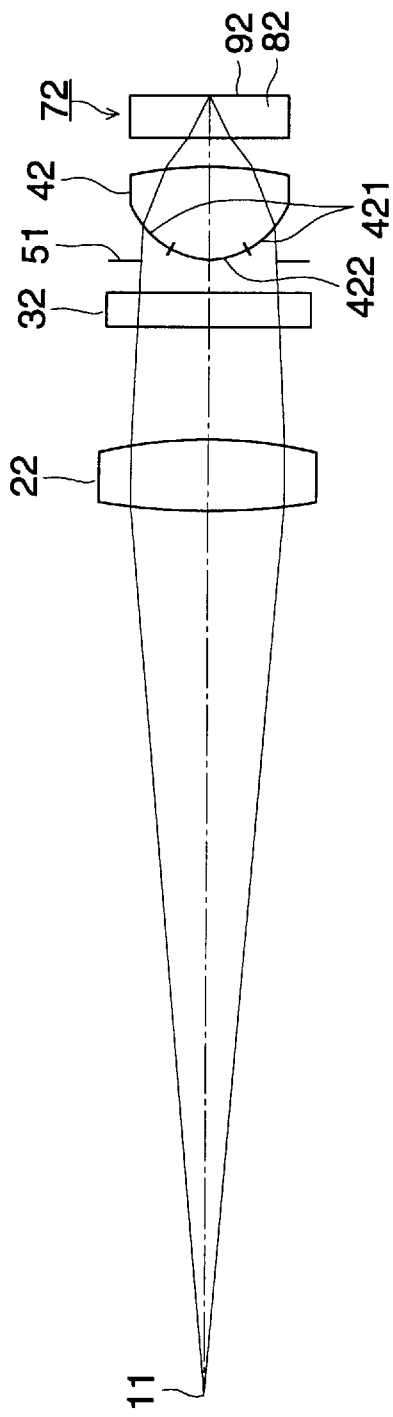
FIG. 6 (a)
FIG. 6 (b)

RECORDING AND/OR REPRODUCING OPTICAL SYSTEM AND OBJECTIVE LENS FOR OPTICAL INFORMATION RECORDING MEDIUM

BACKGROUND OF THE INVENTION

The present invention relates to a recording and/or reproducing optical system and an objective lens for an optical information recording medium, and more specifically to a recording and/or reproducing optical system and an objective lens for an optical information recording medium by which light flux from a laser source is converged on an information recording surface of the optical information recording medium as an optical spot through a transparent substrate, and information is recorded on the information recording surface and/or information on the information recording surface is reproduced.

Conventionally, various types of optical systems of optical pick-up apparatus, by which information on a CD (compact disk) as an optical information recording medium is recorded and/or reproduced, are widely known. Further, recently, development of a DVD (digital video disk) which is an optical disk having the same size as that of the conventional CD, and has larger capacity than the conventional CD, is being advanced. To be more precisely, in the DVD, as the a short wavelength red semiconductor laser has been put into practical use, this laser is used as the semiconductor laser to be used corresponding to an increase of the capacity; and the density of the DVD is highly increased such that a numerical aperture NA of an objective lens of the optical pick-up is 0.6, and the thickness of the transparent substrate is 0.6 mm which is a half of the thickness of the conventional CD, and further, a track pitch is 0.74 μm and the minimum pit length is 0.4 μm, which are smaller than a half of the track pitch of 1.6 μm and the minimum pit length of 0.83 μm of the CD.

When the CD is used for recording and/or reproducing in the DVD optical system, the wavefront aberration is increased, and the shape of optical spot which can record and/or reproduce information, can not be obtained. It will be further detailed referring to the drawings. FIG. 16 is a view showing the relationship between the thickness of transparent substrate and the wavefront aberration. When the thickness of the transparent substrate is changed in an objective lens system, which is optimized under the condition that NA is 0.6, the wavelength of the laser beam emitted from the laser source is 635 nm, the thickness of the transparent substrate is 0.6 mm, and the refractive index of the transparent substrate is 1.58, the wavefront aberration is increased by 0.01λ rms per 0.01 mm deviation of the thickness of the substrate. When the thickness of the transparent substrate deviates by ±0.07 mm, the wavefront aberration deviates by 0.07 λrms, and reaches the Marechal limit value which is a criterion within which recording and/or reproducing operations can normally be performed. As described above, when the thickness of the transparent substrate is switched to that (1.2 mm) of the CD in the optimally designed optical system in the thickness (0.6 mm) of the transparent substrate of the DVD, very large spherical aberration is generated, and thereby, it is difficult to record and/or reproduce both the CD and DVD by a single optical system.

Accordingly, as an optical pick-up apparatus to record and/or reproduce information of these 2 optical information recording medium, an optical pick-up apparatus using the optical system shown in FIG. 17 is widely known. In the optical system of the optical pick-up apparatus, an optical element which is a part of the optical system, is switched so that both the CD and DVD can be used. Referring to the drawing, it will be more precisely detailed. FIG. 17 is a sectional view of a recording and/or reproducing optical system for the optical information recording medium (CD, DVD) of a conventional example. In the drawing, when the DVD is recorded and/or reproduced, the light flux emitted from a laser source 11 passes through a hologram beam splitter 62, enters a collimator lens 21, and becomes parallel flux; this flux is limited to predetermined flux by an aperture-stop 51, passes through an objective lens 451, and a non-aberration light spot is image-formed on an information recording surface 91 through a transparent substrate 81 of an optical information recording medium 71. The light flux, modulated by an information pit and reflected by the information recording surface 91, returns to the hologram beam splitter 62 through the objective lens 451 and the collimator lens 21, separated here from an optical path from the laser source 11, and enters a light beam detector 61. This light beam detector 61 is composed of multi-divided PIN photodiodes, from each element of which a current proportional to the intensity of the entered light flux is outputted, and the current is sent to a detection circuit system, not shown in the drawing, in which an information signal, a focus error signal, and a track error signal are generated. According to these focus error signal and the track error signal, the objective lens 451 is controlled in the focusing direction and the tracking direction by a two-dimensional actuator (not shown in the drawing) composed of a magnetic circuit, a coil, etc., so that the light spot position is always adjusted onto the information track. When the CD is recorded or reproduced, the aperture-stop and the objective lens are respectively switched to an aperture-stop 52 and an objective lens 452. The light flux emitted from the laser source 11, enters a collimator lens 21, and becomes parallel light flux; the light flux is limited to the predetermined light flux by the aperture-stop 52, passes through the objective lens 452, and the non-aberration light spot is image-formed onto an information recording surface 92 through a transparent substrate 82 of an optical information recording medium 72.

However, in the optical pick-up apparatus, it is necessary to switch a portion of the optical system, and therefore, there are problems of troublesome operations, complicated structures, or an increase of the overall size of the apparatus.

Accordingly, a proposal has been made in which the DVD and CD can be recorded and/or reproduced by a single objective lens in the optical system of the optical pick-up apparatus.

According to a method disclosed in Japanese Patent Publication Open to Public Inspection No. 98431/1995, a hologram is provided on the information pick-up apparatus, and when the 0-order light and the 1-order light passing through the hologram, are respectively allocated to the DVD and CD, a spot, having diffraction limited performance corresponding to each optical information recording medium, can be obtained.

Further, according to a method disclosed in Japanese Patent Publication Open to Public Inspection No. 302437/1995, when a refractive surface of the objective lens is divided into a plurality of ring-shaped areas, a spot having diffraction limited performance corresponding to either of optical information recording media, can be obtained, although the objective lens is positioned at the almost same position in the direction of the optical axis with respect to both the DVD and the CD.

However, in the method in which the light flux from the laser source is divided for the DVD and the CD, in the methods disclosed in Japanese Patent Publication Open to Public Inspection Nos. 98431/1995 and 302437/1995, because plurality of light flux are always emitted to the information recording surface of the optical information recording medium, when information is read out by the light spot of one light flux, the other light flux does not contribute to the reading, and becomes unnecessary light, resulting in a factor of an increase of noise. Further, because the laser light intensity is divided for use, there are problems of a decrease of S/N ratio due to a decrease of a quantity of light, or an increase of power consumption and a decrease of the laser life when a quantity of light is increased.

As a problem of a technology by which the first optical information recording medium (DVD) which has a thin transparent substrate and has high density, and the second optical information recording medium (CD) which has a thick transparent substrate and has low density, can be recorded and/or reproduced without switching the optical system in the optical system of the above optical pick-up apparatus, a technology to obtain a more accurate light spot by which the first optical information recording medium and the second optical information recording medium can be recorded and/or reproduced, on respective information recording surfaces, is greatly required.

SUMMARY OF THE INVENTION

In view of the foregoing problems, an object of the present invention is to provide a recording and/or reproducing optical system for optical information recording medium, in which optical information recording media having different transparent substrate thickness can be recorded and/or reproduced by an optical system of a single optical pick-up apparatus, and which is more accurate, has a simple structure and is compact.

An object of the present invention is attained by the following recording and/or reproducing optical system for the optical information recording medium. In a recording and/or reproducing optical system for the optical information recording medium, by which light flux from the laser source is converged as a light spot on the information recording surface of the optical information recording medium through a transparent substrate, and information is recorded on the information recording surface and/or information on the information recording surface is reproduced, the wavefront aberration is not continuous but step-like, when the optical system operates through the transparent substrate having the thickness d. In this case, when an amount of wavefront aberration of the optical system, in which the numerical aperture NA of the border portion of the step is larger, is set to W, an amount of wavefront aberration in the case of the smaller NA, is $W_2$, and the wavelength is $\lambda$, the object of the present invention can be attained by the recording and/or reproducing optical system for optical information recording medium which satisfies the following relationships;

$$W_1 - W_2 = m\lambda - \delta \quad (1)$$

$$|m| \leq 10 \text{ (} m \text{ is integer including zero)} \quad (2)$$

$$0 < \delta < 0.34\lambda \quad (3)$$

In other words, $W_1$ represents a wavefront aberration at a point of the step when a curve having the step of the wavefront aberration is traced from a periphery toward an axis of the optical system, $W_2$ represents a wavefront aberration at the point of the step when the curve is traced from the axis toward the periphery of the optical system.

When the optical system is within the above expressions (1), (2) and (3), a fine optical spot by which the optical information recording medium, in which the transparent substrate is thin and the density is high, and the optical information recording medium in which the transparent substrate is thick and the density is low, can be recorded and/or reproduced, can be obtained on respective information recording surfaces.

There are fluctuation due to the individual difference, and wavelength variation due to temperature change in the light source, specifically, in the wavelength of the semiconductor laser. The wavelength variation occurs by approximately 5%, and therefore, when the value of m exceeds the upper limit of the expression (2), and is increased, the influence of the wavelength variation becomes too large, so that a fine light spot can not be obtained, and the object cannot be attained.

Further, when the range of the expression (3) is changed to $0 < \delta < 0.25\lambda$, an excellent light spot can be obtained on both information recording surfaces.

Further, when the numerical aperture on the optical information recording medium side of the objective lens is $NA_1$, the above-described step is preferably between 0.33 $NA_1$ and 0.84 $NA_1$, and still further, in order to obtain an excellent light spot on both information recording surfaces, the step is more preferably provided between 0.5 $NA_1$ and 0.67 $NA_1$.

An object of the present invention is attained by the following recording and/or reproducing objective lens for the optical information recording medium. In a recording and/or reproducing objective lens for the optical information recording medium, by which light flux from the laser source is converged as a light spot on the information recording surface of the optical information recording medium through a transparent substrate, and information is recorded on the information recording surface and/or information on the information recording surface is reproduced, the wavefront aberration is not continuous but step-like, when objective lens operates through the transparent substrate having the thickness d; and when an amount of wavefront aberration of the objective lens, in which the numerical aperture NA of the border portion of the step is larger, is set to $W_1$, an amount of wavefront aberration in the case of the smaller NA, is $W_2$, and the wavelength is $\lambda$, the object of the present invention can be attained by the recording and/or reproducing objective lens for optical information recording medium which satisfies the following relationships;

$$W_1 - W_2 = m\lambda - \delta \quad (1')$$

$$|m| \leq 10 \text{ (} m \text{ is integer including zero)} \quad (2')$$

$$0 < \delta < 0.34\lambda \quad (3').$$

In other words, $W_1$ represents a wavefront aberration at a point of the step when a curve having the step of the wavefront aberration is traced from a periphery toward an axis of the objective lens, $W_2$ represents a wavefront aberration at the point of the step when the curve is traced from the axis toward the periphery of the objective lens.

When the objective lens is within the above expressions (1'), (2') and (3'), a fine light spot by which the optical information recording medium, in which the transparent substrate is thin and the density is high, and the optical information recording medium in which the transparent substrate is thick and the density is low, can be recorded and/or reproduced, can be obtained on respective information recording surfaces.

There are fluctuation due to the individual difference, and wavelength variation due to temperature change, in the light source, specifically, in the wavelength of the semiconductor laser. The wavelength variation occurs by approximately 5%, and therefore, when the value of m exceeds the upper limit of the expression (2'), and is increased, the influence of the wavelength variation becomes too large, so that a fine light spot can not be obtained, and the object can not be attained.

Further, when the range of the expression (3') is changed to $0<\delta<0.25\lambda$, an excellent light spot can be obtained on both information recording surfaces.

Further, when the numerical aperture on the optical information recording medium side of the objective lens is $NA_1$, the above-described step is preferably between 0.33 NA, and 0.84 $NA_1$, and still further, in order to obtain an excellent light spot on both information recording surfaces, the step is more preferably provided between 0.5 $NA_1$, and 0.67 $NA_1$.

Incidentally, the expressions (1), (2) and (3), which will be described hereinafter, respectively means the expressions (1) or (1'), (2) or (2'), and (3) or (3').

In this connection, the recording and/or reproducing optical system used in this specification, includes a recording optical system, reproducing optical system, and optical system for both recording and reproducing uses.

BRIEF DESCRIPTION OF THE DRAWINGS

FIGS. 1(a) and 1(b) are sectional views of a recording and/or reproducing optical system for an optical information recording medium in examples.

FIGS. 5(a) and 5(b) are sectional views of the recording and/or reproducing optical system for the optical information recording medium in examples.

FIGS. 6(a) and 6(b) are sectional views of the recording and/or reproducing optical system for the optical information recording medium in examples.

DETAILED DESCRIPTION OF THE PREFERRED EMBODIMENT

Figure 2:
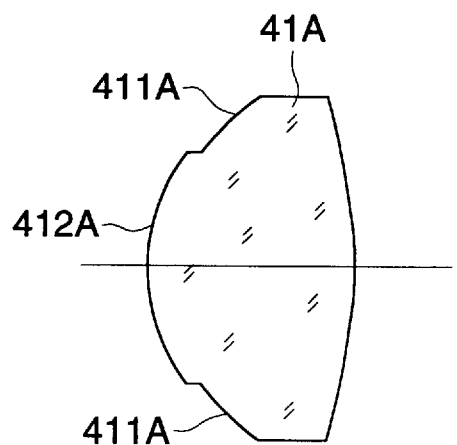
FIGS. 2(a), 2(b), 2(c) and 2(d) are illustrative sectional views of objective lenses of the optical system in examples.
Figure 2:
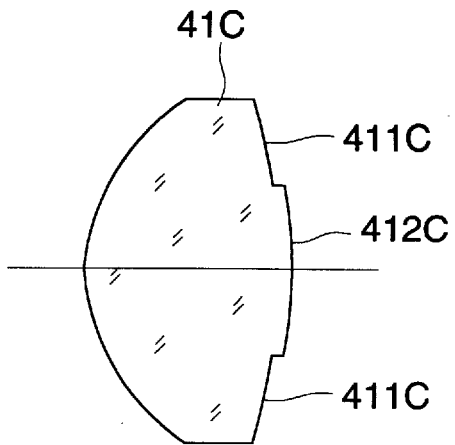
Figure 2:
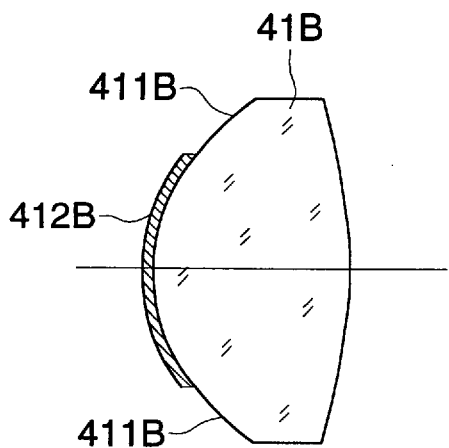
Figure 2:
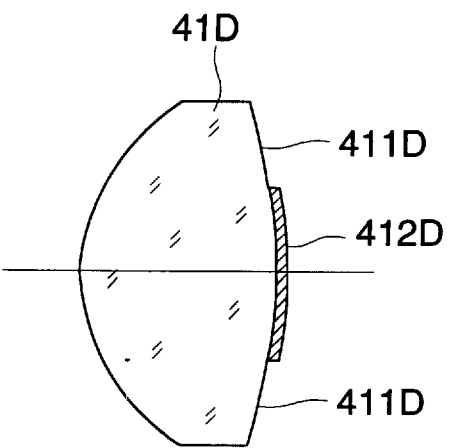

Referring to the drawings, the present example will be described below.

EXAMPLE 1-1

Initially, referring to the drawing, an example of a recording and/or reproducing optical system for an optical information recording medium, according to the present invention, will be described below. FIGS. 1(a) and 1(b) are sectional views of a recording and/or reproducing optical system for an optical information recording medium in the present example. More specifically, FIG. 1(a) shows an optical system when it operates through a transparent substrate of the first optical information recording medium (DVD), and FIG. 1(b) is the optical system when it operates through a transparent substrate of the second optical information recording medium (CD). In FIG. 1(a), on the surface of an objective lens 41 on the side of a light source, wavefront aberration of the optical system is not continuous and step-like, and therefore, light flux far from the optical axis in the direction perpendicular to the optical axis, passes through a surface 411, and the light flux near the optical axis passes through a surface 412. In this connection, this will be explained in FIGS. 9(a) through 9(c) of the example which will be detailed later.

The emitted light from a laser source 11 passes through a collimator lens 21, becomes parallel light, passes through an aperture-stop 51, further passes through an infinite conjugation type objective lens 41, passes through a transparent substrate 81 of an optical information recording medium 71, and is converged on an information recording surface 91. In the same manner as described above, in FIG. 1(b), the emitted light from the laser source 11 passes through the collimator lens 21, becomes parallel light, passes through the aperture-stop 51, further passes through the infinite conjugation type objective lens 41, passes through the transparent substrate 82 of the optical information recording medium 72, and is converged on an information recording surface 92.

Next, as a method to generate a step, which is not continuous, in the wavefront aberration of the optical system, a case using an objective lens as shown in FIGS. 1(a) and 1(b) will be described. FIGS. 2(a) through 2(d) are sectional views of models of the objective lens of the optical system in the present example. In FIGS. 2(a) through 2(d), a step is generated in the wavefront aberration by providing a step on the lens surface.

The surface, on the side of the light source, of an objective lens 41A in FIG. 2(a) has a surface 412A and a surface 411A which is connected to the surface 412A through a step, and light flux far from the optical axis in the direction perpendicular to the optical axis passes through the surface 411A, and light flux near the optical axis passes through the surface 412A. FIG. 2(b) is an example in which a step is formed by thin film coating, and the surface, on the side of the light source, of an objective lens 41B has a surface 412B formed by thin film coating, and a surface 411B connected to the surface 412B through the step. Light flux far from the optical axis in the direction perpendicular to the optical axis passes the surface 411B, and light flux near the optical axis passes the surface 412B. The surface on the side of the transparent substrate of an objective lens 41C in FIG. 2(c), has a surface 412C and a surface 411C connected to the surface 412C through the step, and light flux far from the optical axis in the direction perpendicular to the optical axis passes through the surface 411C, and light flux near the optical axis passes through the surface 412C. FIG. 2(d) is an example in which a step is formed by thin film coating. The surface on the side of the transparent substrate, of an objective lens 41D has a surface 412D formed by thin film coating, and a surface 411D connected to the surface 412D through the step, and light flux far from the optical axis in the direction perpendicular to the optical axis, passes through the surface 411D and the light flux near the optical axis passes through the surface 412D. Due to the above description, the length of the optical path of the light flux changes in the central portion and the peripheral portion of the lens, and the wavefront aberration of the optical system is not continuous, and a step can be generated in the wavefront aberration. Further, when the amount of the step is set within the range of the above-described expressions (1), (2) and (3), a fine light spot, by which an optical information recording medium, which has a thin transparent substrate and high density, and an optical information recording medium, which has a thick transparent substrate and low density, can be recorded and/or reproduced, can be obtained on respective information recording surfaces.

EXAMPLE 1-2

Figure 3:
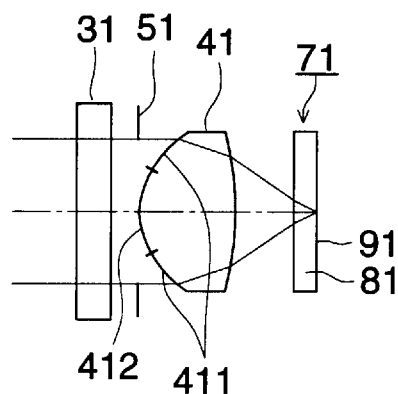
FIGS. 3(a) and 3(b) are sectional views of the recording and/or reproducing optical system for the optical information recording medium in examples.
Figure 3:
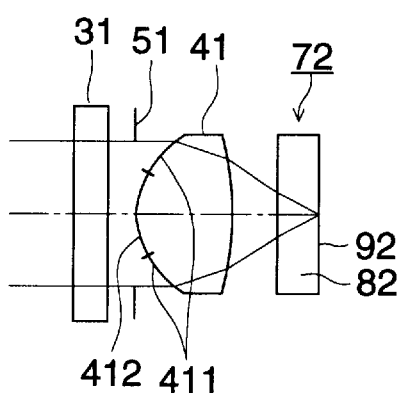

Referring to the drawings, an example of the recording and/or reproducing optical system for the optical information recording medium according to the present invention will be described below. FIGS. 3(a) and 3(b) are sectional views of the recording and/or reproducing optical system for the optical information recording medium of the example. More precisely, FIG. 3(a) is an optical system when it operates through a transparent substrate of the first optical information recording medium (DVD), and FIG. 3(b) is an optical system when it operates through a transparent substrate of the second optical information recording medium (CD). The optical system is structured such that an aberration correcting optical element is added to the optical system of Example (1-1). On the surface, on the side of the light source, of the objective lens 41, the light flux far from the optical axis in the direction perpendicular to the optical axis, passes through the surface 411, as shown in the drawing, and the light flux near the optical axis passes through the surface 412. It will be detailed in FIGS. 9(a) through 9(c) of the present example. In FIG. 3(a), emitted light from a laser source 11 passes through a aberration correcting optical element 31, an aperture-stop 51, passes through the infinite conjugation type objective lens 41, further passes through a transparent substrate 81 of the optical information recording medium 71, and is converged on the information recording surface 91. In FIG. 3(b), in the same manner as described above, the light emitted from the laser source 11 passes through the aberration correcting optical element 31, the aperture-stop 51, passes through the infinite conjugation type objective lens 41, passes through a transparent substrate 82 of the optical information recording medium 72, and is converged on the information recording surface 92.

Figure 4:
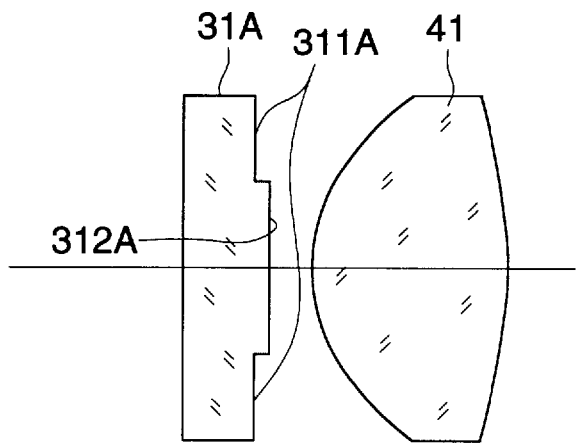
FIGS. 4(a) and 4(b) are illustrative sectional views of aberration correcting optical elements of the optical system in examples.
Figure 4:
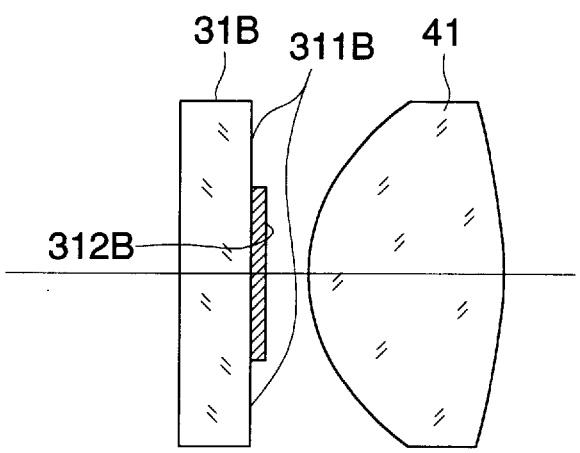

Next, as a method to generate a step in the wavefront aberration of the optical system, so that it is not continuous, a case using an aberration correcting optical element will be described. FIGS. 4(a) and 4(b) are sectional views of models of an aberration correcting optical element of the optical system of the present example. A surface, on the side of the objective lens, of an aberration correcting optical element 31A in FIG. 4(a), has a surface 312A and a surface 311A connected to the surface 312A through a step, and light flux far from the optical axis in the direction perpendicular to the optical axis, passes through the surface 311A, and light flux near the optical axis passes through the surface 312A. FIG. 4(b) is an example in which the step is formed by thin film coating. The surface, on the side of the objective lens, of an aberration correcting optical element 31B, has a surface 312B formed by thin film coating, and a surface 311B connected to the surface 312B through a step, and light flux far from the optical axis in the direction perpendicular to the optical axis, passes through the surface 311B, and light flux near the optical axis passes through the surface 312B. Due to the foregoing, the wavefront aberration of the optical system is not continuous, and a step can be generated in the wavefront aberration. Further, when the amount of the step is set within the range of the above-described expressions (1), (2) and (3), a fine light spot, by which an optical information recording medium, which has a thin transparent substrate and high density, and an optical information recording medium, which has a thick transparent substrate and low density, can be recorded and/or reproduced, can be obtained on respective information recording surfaces.

EXAMPLE 2-1

Referring to the drawings, an example of the recording and/or reproducing optical system for the optical information recording medium according to the present invention will be described below. FIGS. 5(a) and 5(b) are sectional views of the recording and/or reproducing optical system for the optical information recording medium of the example. More precisely, FIG. 5(a) is an optical system when it operates through a transparent substrate of the first optical information recording medium (DVD), and FIG. 5(b) is an optical system when it operates through a transparent substrate of the second optical information recording medium (CD). On the surface, on the side of the light source, of the objective lens 42, the light flux far from the optical axis in the direction perpendicular to the optical axis, passes through the surface 421, as shown in the drawing, and the light flux near the optical axis passes through the surface 422. It will be detailed in FIGS. 9(a) to 9(c) of the present example. In FIG. 5(a), the emitted light from the laser source 11 passes through a coupling lens 22, and becomes converged light, passes through the aperture-stop 51, further passes through a converging light limitation type objective lens 42, passes through a transparent substrate 81 of an optical information recording medium 71, and is converged on an information recording surface 91. In FIG. 5(b), in the same manner as described above, the emitted light from the laser source 11 passes through the coupling lens 22, becomes converged light, passes through the aperture-stop 51, further passes through the converging light limitation type objective lens 42, passes through a transparent substrate 82 of an optical information recording medium 72, and is converged on an information recording surface 92. Due to the foregoing, the wavefront aberration of the optical system is not continuous, and a step can be generated in the wavefront aberration. Further, when the amount of the step is set within the range of the above-described expressions (1), (2) and (3), a fine light spot, by which an optical information recording medium, which has a thin transparent substrate and high density, and an optical information recording medium, which has a thick transparent substrate and low density, can be recorded and/or reproduced, can be obtained on respective information recording surfaces.

EXAMPLE 2-2

Referring to the drawings, an example of the recording and/or reproducing optical system for the optical information recording medium according to the present invention will be described below. FIGS. 6(a) and 6(b) are sectional views of the recording and/or reproducing optical system for the optical information recording medium of the example. More precisely, FIG. 6(a) is an optical system when it operates through a transparent substrate of the first optical information recording medium (DVD), and FIG. 6(b) is an optical system when it operates through a transparent substrate of the second optical information recording medium (CD). The optical system is structured such that an aberration correcting optical element is added to the optical system of Example (2-1). On the surface, on the side of the light source, of the objective lens 42, the light flux far from the optical axis in the direction perpendicular to the optical axis, passes through the surface 421, as shown in the drawing, and the light flux near the optical axis passes through the surface 422. It will be detailed in FIGS. 9(a) through 9(b) of the present example. In FIG. 6(a), the emitted light from the laser source 11 passes through a coupling lens 22, and becomes converged light, passes through the aberration correcting optical element 32 and the aperture-stop 51, further passes through a converging light limitation type objective lens 42, passes through a transparent substrate 81 of an optical information recording medium 71, and is converged on an information recording surface 91. In FIG. 6(b), in the same manner as described above, the emitted light from the laser source 11 passes through the coupling lens 22, becomes converged light, passes through the aberration correcting optical element 32 and the aperture-stop 51, further passes through the converging light limitation type objective lens 42, passes through a transparent substrate 82 of an optical information recording medium 72, and is converged on an information recording surface 92. Due to the foregoing, the wavefront aberration of the optical system is not continuous, and a step can be generated in the wavefront aberration. Further, when the amount of the step is set within the range of the above-described expressions (1), (2) and (3), a fine light spot, by which an optical information recording medium, which has a thin transparent substrate and high density, and an optical information recording medium, which has a thick transparent substrate and low density, can be recorded and/or reproduced, can be obtained on respective information recording surfaces.

EXAMPLE 3-1

Figure 7:
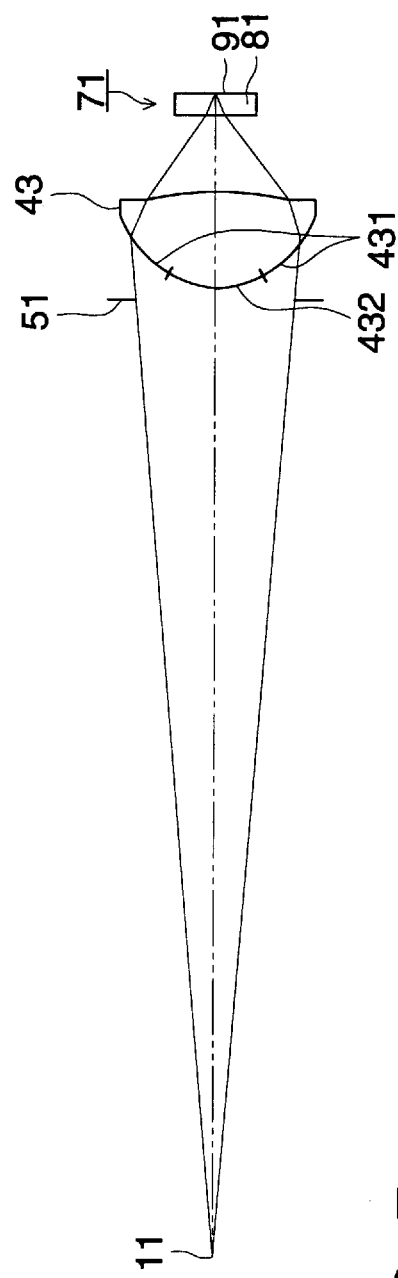
FIGS. 7(a) and 7(b) are sectional views of the recording and/or reproducing optical system for the optical information recording medium in examples.
Figure 7:
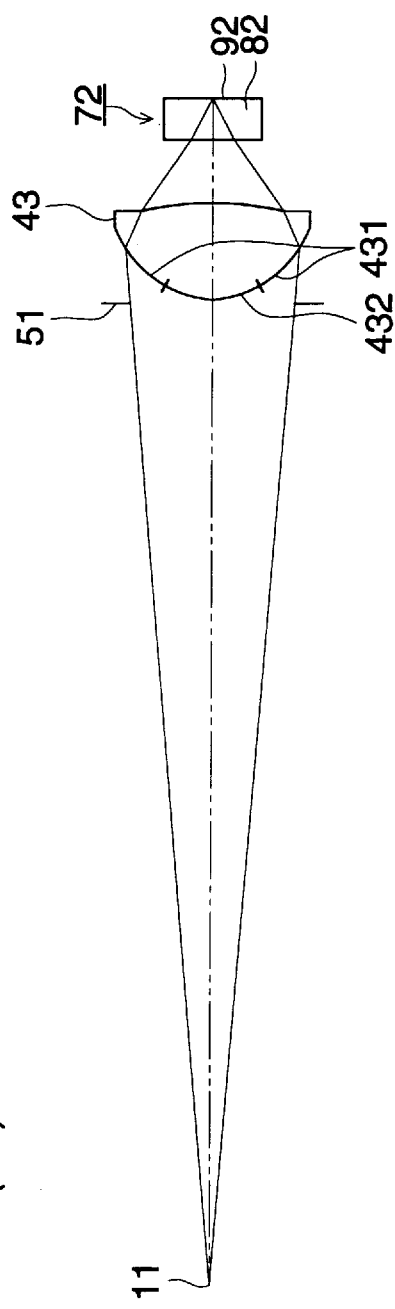

Referring to the drawings, an example of the recording and/or reproducing optical system for the optical information recording medium according to the present invention will be described below. FIGS. 7(a) and 7(b) are sectional views of the recording and/or reproducing optical system for the optical information recording medium of the example. More precisely, FIG. 7(a) is an optical system when it operates through a transparent substrate of the first optical information recording medium (DVD), and FIG. 7(b) is an optical system when it operates through a transparent substrate of the second optical information recording medium (CD). On the surface, on the side of the light source, of the objective lens 43, the light flux far from the optical axis in the direction perpendicular to the optical axis, passes through the surface 431, as shown in the drawing, and the light flux near the optical axis passes through the surface 432. It will be detailed in FIG. 9 of the present example. In FIG. 7(a), the emitted light from the laser source 11 passes through the aperture-stop 51, further passes through the limit conjugation type objective lens 43, passes through a transparent substrate 81 of an optical information recording medium 71, and is converged on an information recording surface 91. In FIG. 7(b), in the same manner as described above, the emitted light from the laser source 11 passes through the aperture-stop 51, further passes through the limit conjugation type objective lens 43, passes through a transparent substrate 82 of an optical information recording medium 72, and is converged on an information recording surface 92. Due to the foregoing, the wavefront aberration of the optical system is not continuous, and a step can be generated in the wavefront aberration. Further, when the amount of the step is set within the range of the above-described expressions (1), (2) and (3), a fine light spot, by which an optical information recording medium, which has a thin transparent substrate and high density, and an optical information recording medium, which has a thick transparent substrate and low density, can be recorded and/or reproduced, can be obtained on respective information recording surfaces.

EXAMPLE 3-2

Figure 8:
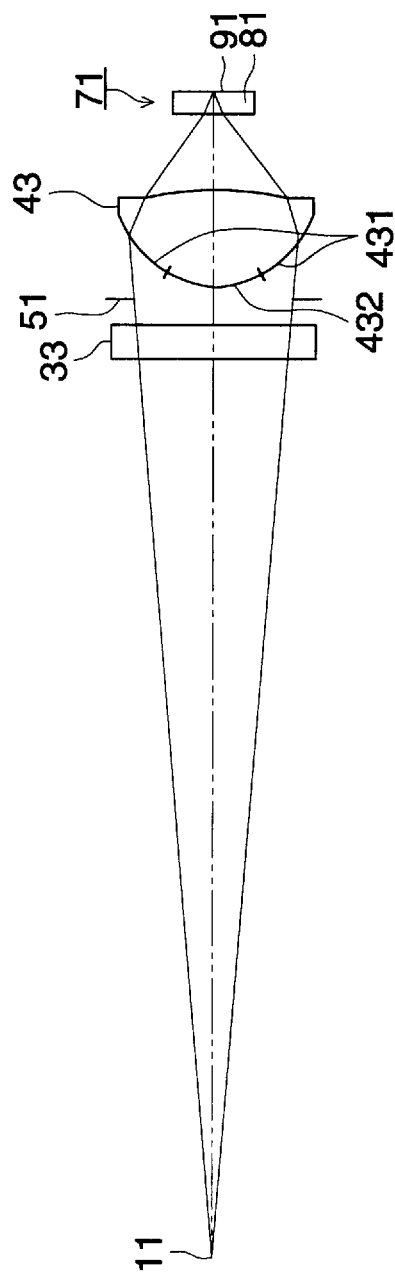
FIGS. 8(a) and 8(b) are sectional views of the recording and/or reproducing optical system for the optical information recording medium in examples.
Figure 8:
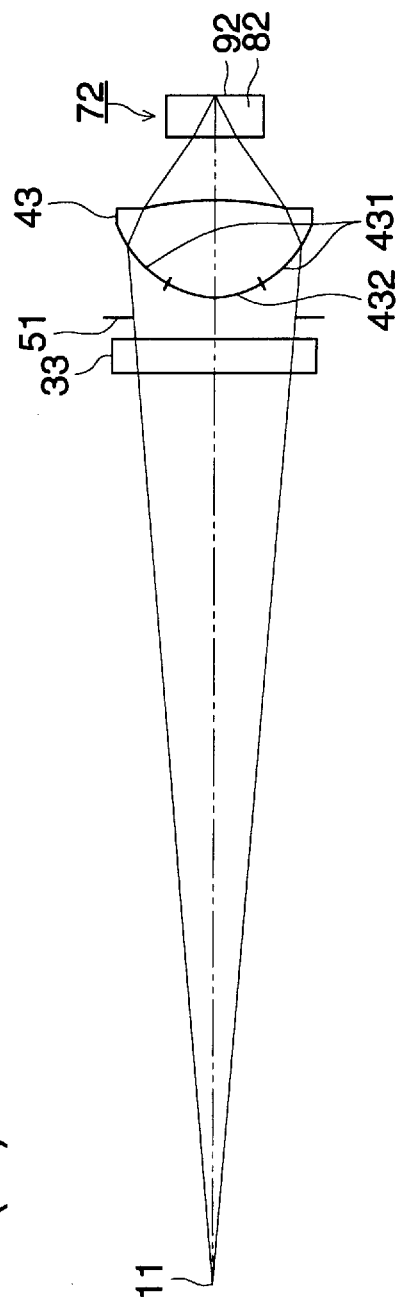

Referring to the drawings, an example of the recording and/or reproducing optical system for the optical information recording medium according to the present invention will be described below. FIGS. 8(a) and 8(b) are sectional views of the recording and/or reproducing optical system for the optical information recording medium of the example. More precisely, FIG. 8(a) is an optical system when it operates through a transparent substrate of the first optical information recording medium (DVD), and FIG. 8(b) is an optical system when it operates through a transparent substrate of the second optical information recording medium (CD). This optical system is structured such that the aberration correcting optical element is added to the optical system of Example (3-1). On the surface, on the side of the light source, of the objective lens 43, the light flux far from the optical axis in the direction perpendicular to the optical axis, passes through the surface 431, as shown in the drawing, and the light flux near the optical axis passes through the surface 432. It will be detailed in FIGS. 9(a) to 9(c) of the present example. In FIG. 8(a), the emitted light from the laser source 11 passes through the aberration correcting optical element 32 and the aperture-stop 51, further passes through the limit conjugation type objective lens 43, passes through a transparent substrate 81 of an optical information recording medium 71, and is converged on an information recording surface 91. In FIG. 8(b), in the same manner as described above, the emitted light from the laser source 11 passes through the aberration correcting optical element 32 and the aperture-stop 51, further passes through the limit conjugation type objective lens 43, passes through the transparent substrate 82 of the optical information recording medium 72, and is converged on the information recording surface 92. Due to the foregoing, the wavefront aberration of the optical system is not continuous, and a step is generated in the wavefront aberration. Further, when the amount of the step is set within the range of the above-described expressions (1), (2) and (3), a fine light spot, by which an optical information recording medium, which has a thin transparent substrate and high density, and an optical information recording medium, which has a thick transparent substrate and low density, can be recorded and/or reproduced, can be obtained on respective information recording surfaces.

EXAMPLE

Herein, referring to the drawings, a recording and/or reproducing optical system for the optical information recording medium, composed of an infinite conjugation type objective lens, by which parallel light passed through a collimator lens which converts the emitted light from the laser source to approximate parallel light, is converged on the information recording surface, will be described, as a representative example of the optical system of the example of the present invention, in comparison with a comparative example.

Initially, symbols to be used for the example, will be explained.

Focal distance; f

Lateral magnification ratio of the objective lens; M

Wavelength of the light source; $\lambda$

Numerical aperture on the side of the optical information recording medium; $NA_1$ Surface number of the optical system; s Radius of curvature of each optical surface; r Thickness or interval between optical surfaces; d, d'

The refractive index of each optical part; n

An equation of the shape of aspherical surface when the aspherical surfaces are used for the lens surface and optical surfaces, is shown by [Equation 1].

$$X = (H^2/r)/[1 + \sqrt{1 - (1+K)(H/r)^2}\ ] + \sum_i A_j H^{P_j} \quad \{\text{Equation 1}\}$$

Where, X is the axis in the direction of the optical axis, H is the axis in the direction perpendicular to the optical axis, and the advancing direction of light is positive. Further, r is a paraxial radius of curvature, K is a conical coefficient, Aj is an aspherical surface coefficient, and Pj is an exponent of the aspherical surface.

(Optical system)

Figure 9A:
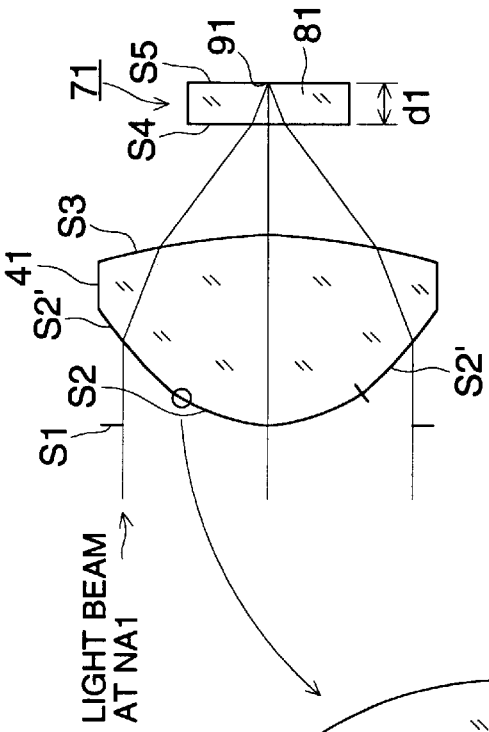
FIGS. 9(a), 9(b) and 9(c) are sectional views and an enlarged view of a main portion of the recording and/or reproducing optical system for the optical information recording medium in examples.
Figure 9B:
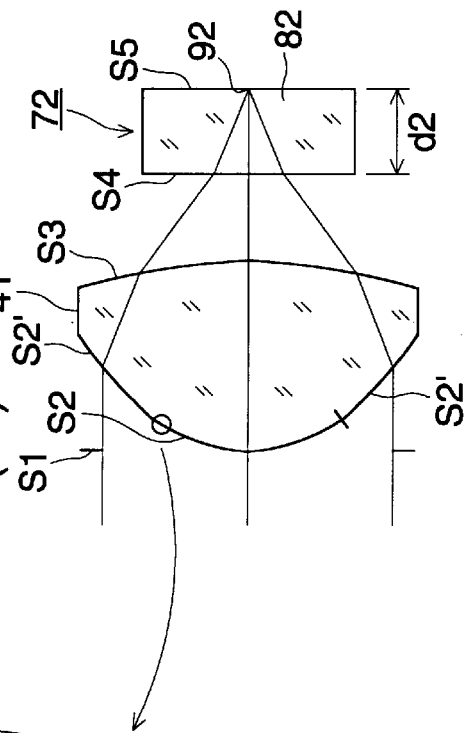
Figure 9C:
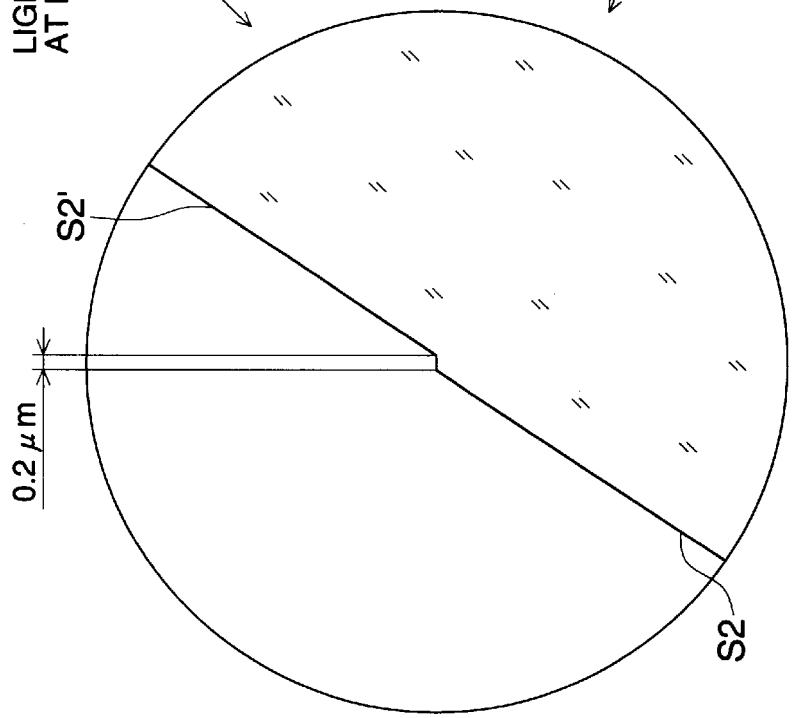

FIGS. 9(a) through 9(c) are sectional views of the recording and/or reproducing optical system for the optical information recording medium and an enlarged view of a main portion of the example. More precisely, FIG. 9(a) is a sectional view of the recording and/or reproducing optical system for the first optical information recording medium (DVD), 9(b) is a sectional view of the recording and/or reproducing optical system for the second optical information recording medium (CD), and further, FIG. 9(c) is an enlarged view of the shape of the surface of the objective lens, corresponding to the border portion of the step in the wavefront aberration. In the drawings, in the case of the first optical information recording medium (DVD), the emitted light from the laser source passes through the collimator lens, not shown, by which the emitted light is converted to the parallel light, passes through an aperture-stop S1, and passes through the infinite conjugation type objective lens 41 by which the parallel light is converged. The surface on the side of the light source, of the objective lens 41A has a surface S2, and the surface S2' connected to the surface S2 through the step. The light flux far from the optical axis in the direction perpendicular to the optical axis passes through the surface S2', and the light flux near the optical axis passes through the surface S2. The light passed through the objective lens, passes through the transparent substrate 81 of the first optical information recording medium 71, and is converged on the information recording surface 91. In the same manner as described above, in the case of the second optical information recording medium (CD), the light passed through the objective lens, passes through the transparent substrate 82 of the second optical information recording medium 72, and is converged on the information recording surface 92.

In the section of the recording and/or reproducing optical system for the optical information recording medium in the comparative example, the surface on the side of the light source, of the objective lens 41 in the above example, is entirely structured of the surface S2.

(Numerical data of the comparative example and Example)

Numerical data of Example are shown in [Table 1] and [Table 2], and optical values of the comparative example are shown in [Table 3] and [Table 4].

Numerical values in tables are data in the example in which the thickness of the transparent substrate of the first optical information recording medium d1=0.6 mm, and that of the second optical information recording medium d2=1.2 mm. In both of the comparative example and Example, the focal distance f=3.40 (mm), the numerical aperture on the side of optical information recording medium $NA_1$=0.60, the lateral magnification ratio of the objective lens M=0, and the wavelength of the light source $\lambda$=635 (nm)

TABLE 1

| s | r | d | d' | n |
|---|---|---|---|---|
| 1 (aperture-atop) | ∞ | 0.00 | 0.00 | 1.0 |
| 2 | 2.062 | 2.60 | 2.60 | 1.49005 |
| 2' | 2.062 | 2.5998 | 2.5998 | 1.49005 |
| 3 | −5.078 | 1.61 | 1.24 | 1.0 |
| 4 | ∞ | 0.60 | 1.20 | 1.58 |
| 5 | ∞ | | | |

Data of S2 in [Table 1] is the data from the optical axis to the height of 0.6 $NA_1$ in the direction perpendicular to the optical axis, the surface S2' is the data from 0.6 $NA_1$ to $NA_1$, and d'=2.5998 of the surface S2' expresses an interval on the optical axis between the intersection with the optical axis when the shape of the surface S2' is extended to the optical axis according to the equation of the shape of the aspherical surface, and the intersection of the surface S3 optical axis.

TABLE 2

| S-th surface | conical coefficient, aspherical coefficient | Exponent of the aspherical surface |
|---|---|---|
| Second surface 2'-th surface | K = −8.39620 × $10^{-1}$ | |
| | A1 = 4.45590 × $10^{-3}$ | P1 = 4.0 |
| | A2 = 2.38400 × $10^{-4}$ | P2 = 6.0 |
| | A3 = 6.65960 × $10^{-6}$ | P3 = 8.0 |
| | A4 = −7.79950 × $10^{-6}$ | P4 = 10.0 |
| Third surface | K = −1.76960 × 10 | |
| | A1 = 9.96800 × $10^{-3}$ | P1 = 4.0 |
| | A2 = −4.44370 × $10^{-3}$ | P2 = 6.0 |
| | A3 = 9.26520 × $10^{-4}$ | P3 = 8.0 |
| | A4 = −8.12840 × $10^{-5}$ | P4 = 10.0 |

TABLE 3

| s | r | d | d' | n |
|---|---|---|---|---|
| 1 (aperture-stop) | ∞ | 0.00 | 0.00 | 1.0 |
| 2 | 2.062 | 2.60 | 2.60 | 1.49005 |
| 3 | −5.078 | 1.61 | 1.24 | 1.0 |
| 4 | ∞ | 0.60 | 1.20 | 1.58 |
| 5 | ∞ | | | |

TABLE 4

| S-th surface | conical coefficient, aspherical coefficient | Exponent of the aspherical surface |
|---|---|---|
| Second surface | K = −8.39620 × 10$^{-1}$ | |
| | A1 = 4.45590 × 10$^{-3}$ | P1 = 4.0 |
| | A2 = 2.38400 × 10$^{-4}$ | P2 = 6.0 |
| | A3 = 6.65960 × 10$^{-6}$ | P3 = 8.0 |
| | A4 = −7.79950 × 10$^{-6}$ | P4 = 10.0 |
| Third surface | K = −1.76960 × 10 | |
| | A1 = 9.96800 × 10$^{-3}$ | P1 = 4.0 |
| | A2 = −4.44370 × 10$^{-3}$ | P2 = 6.0 |
| | A3 = 9.26520 × 10$^{-4}$ | P3 = 8.0 |
| | A4 = −8.12840 × 10$^{-5}$ | P4 = 10.0 |

Incidentally, data of the collimator lens is not written, however, when design of the collimator lens is optimally performed, approximately non-aberration parallel light can enter into the objective lens.

(Wavefront aberration)

Figure 10:
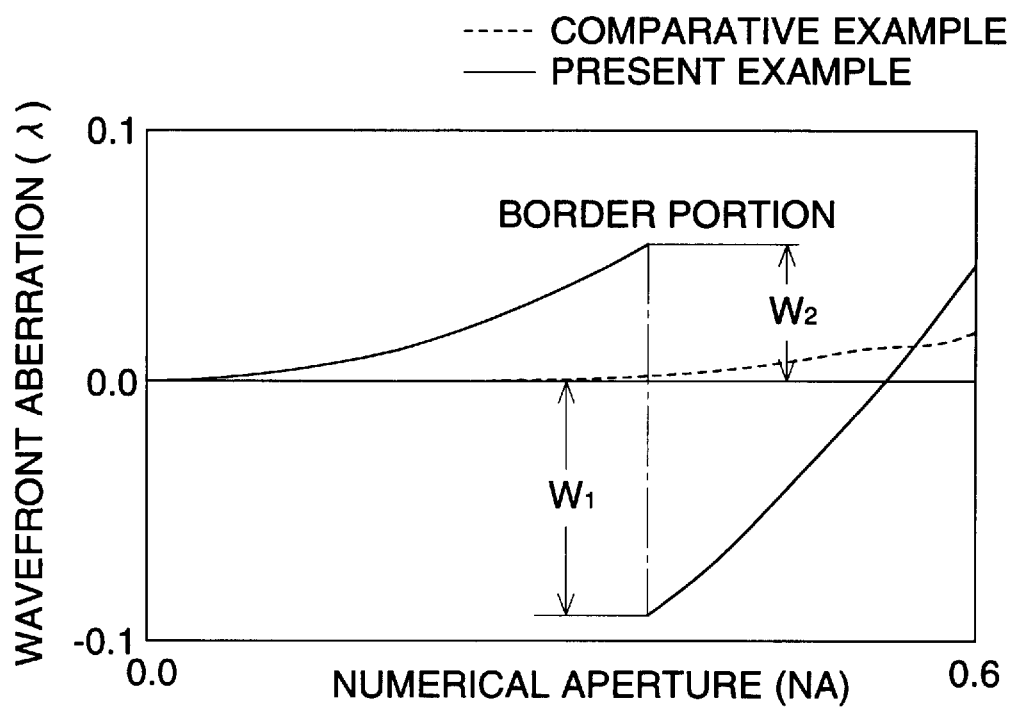
FIG. 10 is a view of the wavefront aberration in the example and a comparative example, when light flux passes through a transparent substrate of a DVD optical information recording medium.
Figure 11:
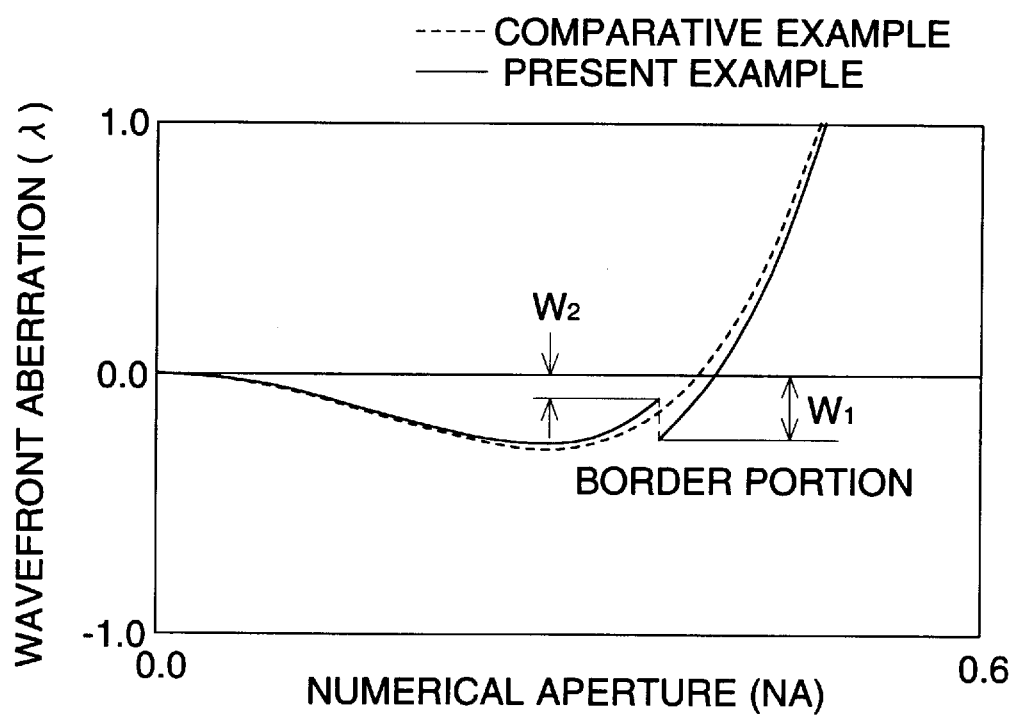
FIG. 11 is a view of the wavefront aberration in the example and a comparative example, when light flux passes through a transparent substrate of a CD optical information recording medium.

Next, the wavefront aberration in the comparative example and Example will be described referring to the drawings. FIG. 10 is a view of the wavefront aberration in Example and the comparative example, when light flux passes through the transparent substrate of the optical information recording medium for the DVD, and FIG. 11 is a view of the wavefront aberration in Example and the comparative example when light flux passes through the transparent substrate of the optical information recording medium for the CD. In the drawings, the axis of abscissa expresses the numerical aperture (NA) and the axis of ordinate expresses the wavefront aberration (λ), and Example is shown by a solid line and the comparative example is shown by a dotted line. In Example, as shown in FIGS. 10 and 11, when the transparent substrate is inserted into the optical system, the wavefront aberration is not continuous but has a step. When the amount of wavefront aberration in the case where the numerical aperture NA in the border portion of the step is larger, is $W_1$, and that in the case where NA is smaller, is $W_2$. In other words, $W_1$ represents a wavefront aberration at a point of the step when a curve having the step of the wavefront aberration is traced from a periphery toward an axis of the objective lens, $W_2$ represents a wavefront aberration at the point of the step when the curve is traced from the axis toward the periphery of the objective lens. Then, in Example, $W_1$=−0.09λ, $W_2$=+0.05λ, M=0, δ=0.14λ, when the first optical information recording medium (DVD) is used, and the foregoing expressions (1), (2) and (3) are satisfied.

(The shape of a light spot)

Figure 12:
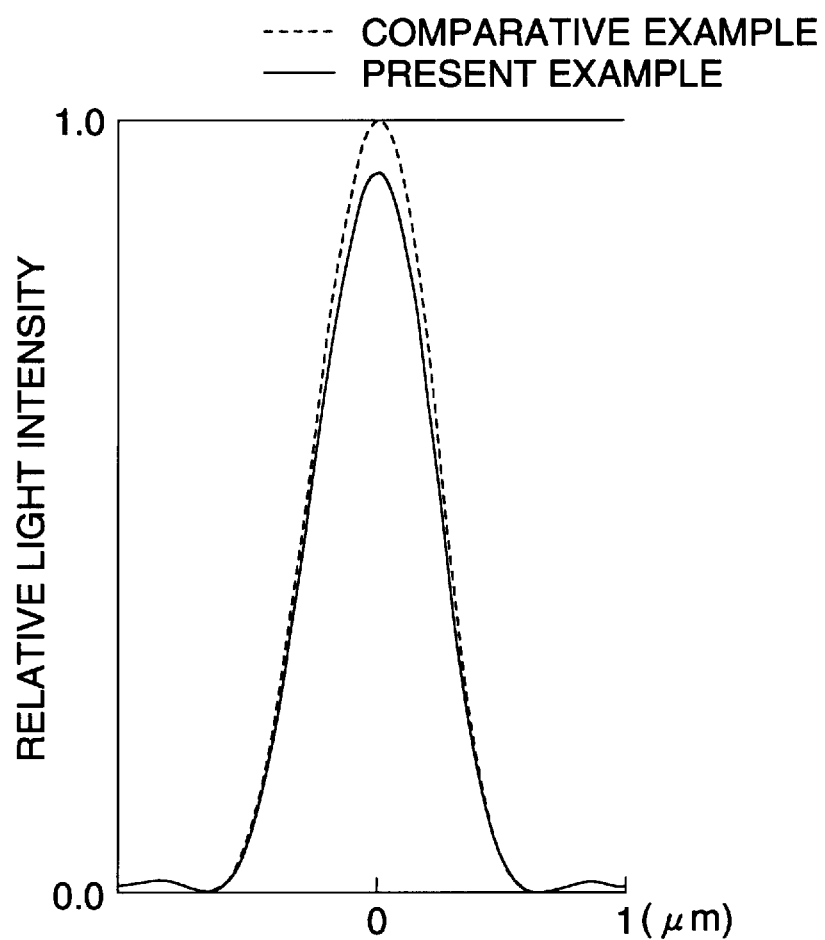
FIG. 12 is a view showing the shape of light spots on the DVD information recording surface in the example and the comparative example.
Figure 13:
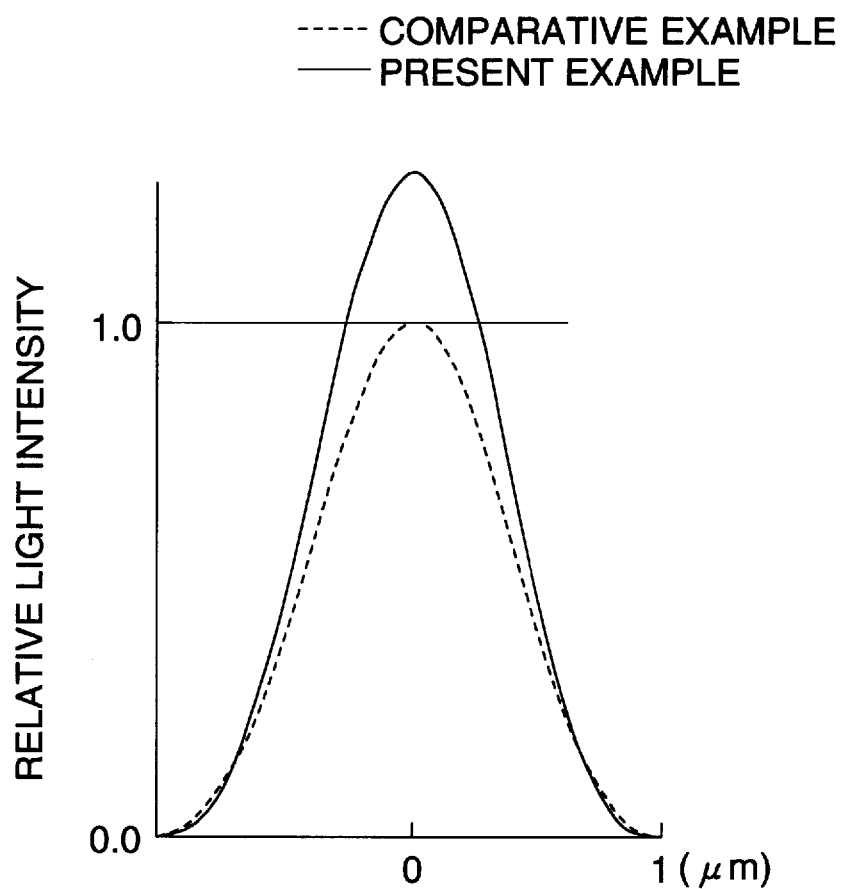
FIG. 13 is a view showing the shape of light spots on the CD information recording surface in the example and the comparative example.

Next, referring to the drawings, the shape of the light spot in the comparative example and the present example will be described. FIG. 12 is a view of the shape of the light spot on the DVD optical information recording surface in the present example and the comparative example, and FIG. 13 is that on the CD optical information recording surface in the present example and the comparative example. In the drawings, the axis of abscissa expresses the length in the direction of width of the shape of light spot, and the axis of ordinate expresses the relative light intensity, in which the solid line shows the present example and the dotted line shows the comparative example. In FIGS. 12 and 13, the relative light intensity is a value when the intensity of the peak value in the comparative example is 1. As shown in FIG. 12, in the comparative example, the spherical aberration is completely corrected through the thickness of the transparent substrate (d1=0.6 mm), and thereby, a fine light spot can be obtained. In the example of the present invention, even in the optical system in which the wavefront aberration is excessively corrected, the same fine light spot as in the comparative example, can be obtained. Further, as shown in FIG. 13, when the transparent substrate (d2=1.2 mm) of the second optical information recording medium (CD) is inserted into the optical system, a fine light spot can be obtained in which the peak value or spread from the center of light spot, of the shape of the light spot in the present example, causes no problem in the practical uses.

Figure 14:
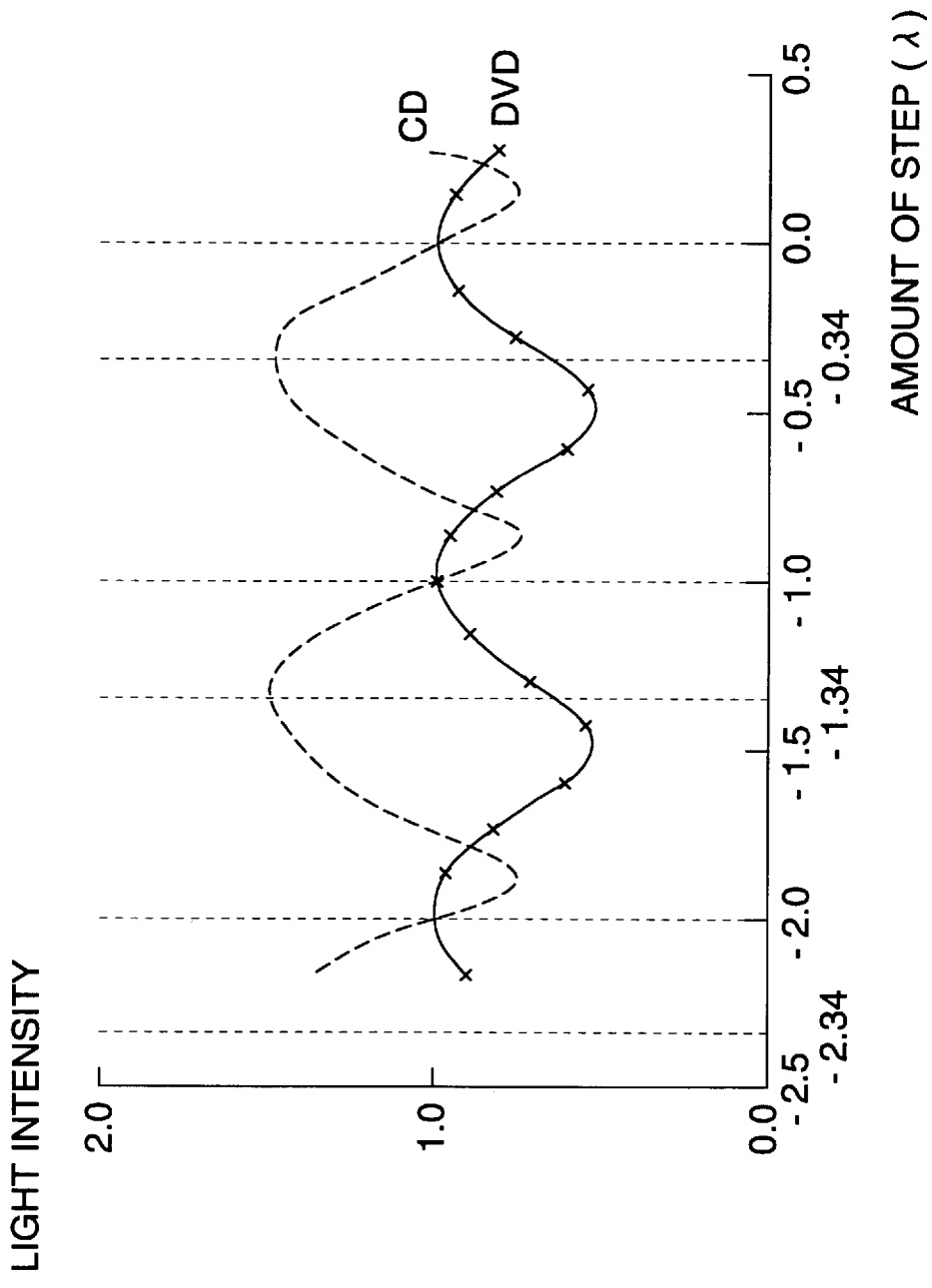
FIG. 14 is a view showing a central light intensity of each spot at its best defocusing position for DVD and CD.

FIG. 14 shows a relative value of a central light intensity of each spot at its best defocusing position for both DVD and CD when the amount of step of each wavefront aberration is zero and the central light intensity of each spot is set to 1.

Figure 15:
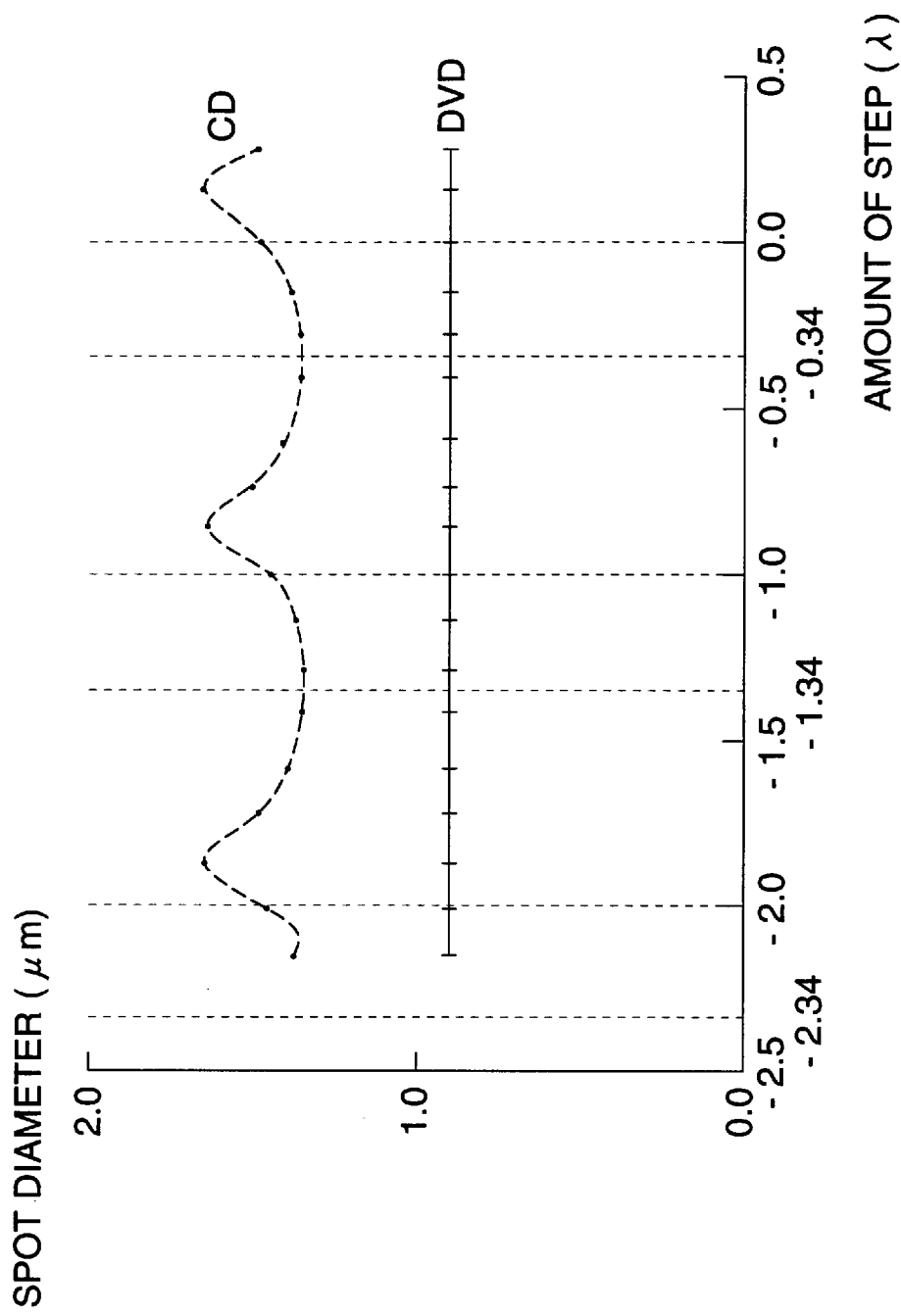
FIG. 15 is a view showing a diameter ($\mu$m) of each spot at the height of $1/e^2$ in its best defocusing position.
Figure 16:
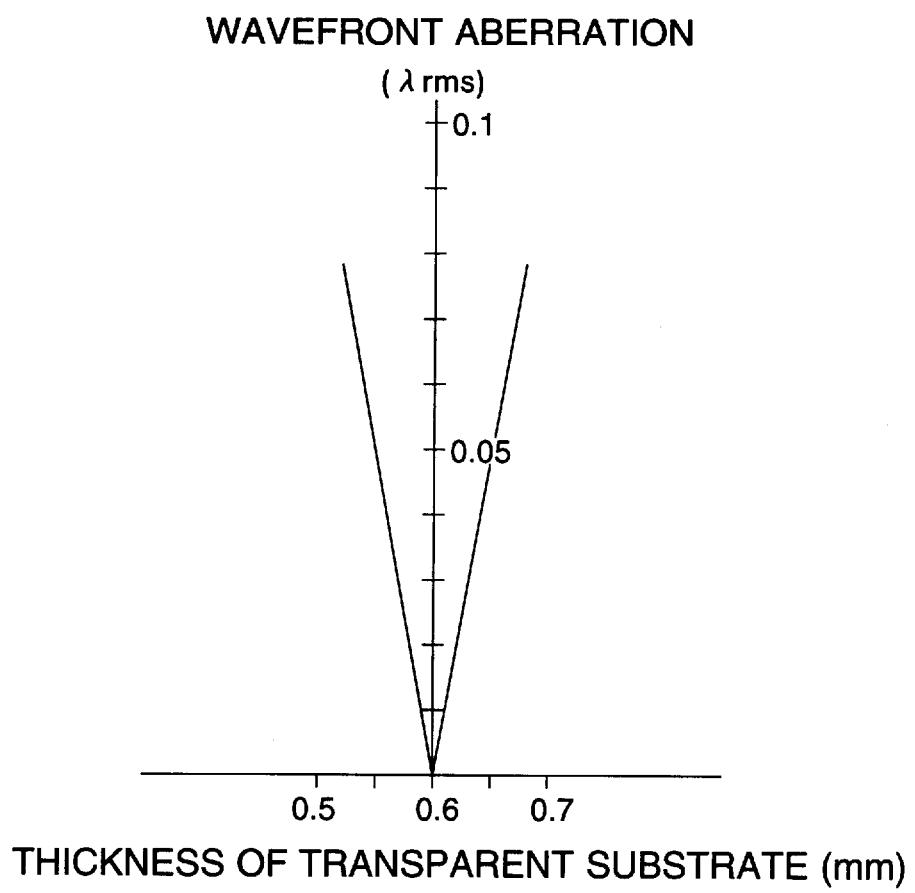
FIG. 16 is a view showing the relationship between the change of the thickness of the transparent substrate and the wavefront aberration.
Figure 17:
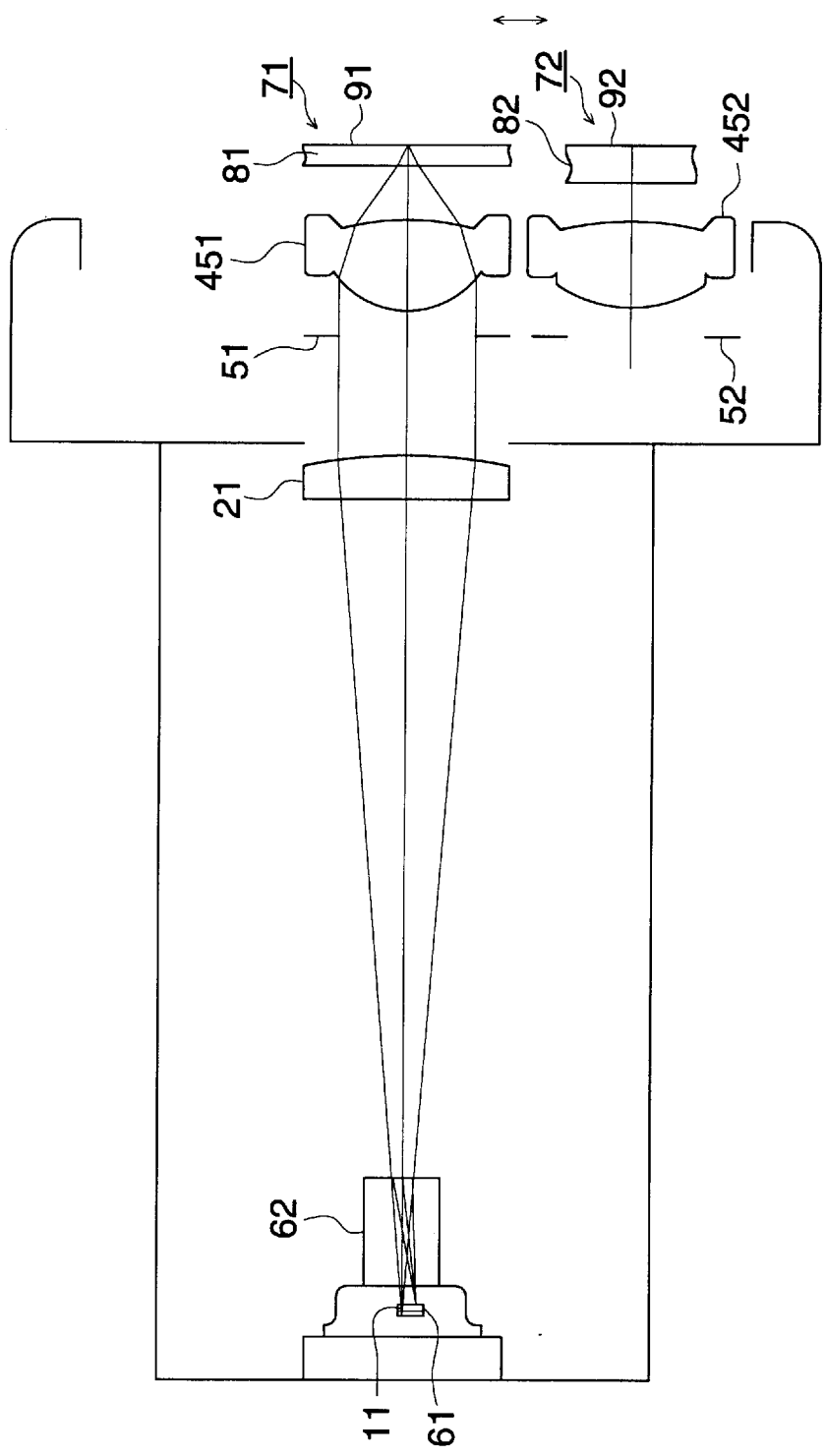
FIG. 17 is a sectional view of the recording and/or reproducing optical system for the optical information recording medium (CD, DVD) in a conventional example.

FIG. 15 shows a diameter (μm) of each spot at the height of 1/e$^2$ in its best defocusing position.

According to FIG. 14 showing the light intensity, it can be observed that the light intensity of CD becomes large when the above-mentioned conditions of $W_1$−$W_2$=mλ−δ and 0<δ<0.34λ are satisfied. On the contrary, the light intensity of DVD becomes small, however, it is allowable when the above-mentioned conditions are satisfied.

According to FIG. 15 showing the spot diameter, it can be observed that the spot diameter of CD becomes small when the above-mentioned conditions are satisfied, which is preferable for CD reproduction.

Consequently, when the conditions are satisfied, both DVD and CD are consistent with each other from viewpoint of the whole situation.

The optical system using the infinite conjugation type objective lens, by which the parallel light passed through the collimator lens is converged, is described in the present example, wherein the diverging light emitted from the laser source is converted into the parallel light by the collimator lens. However, in addition to the structure of the above optical system, the aberration correcting optical element may be placed in the optical path, and thereby, a fine light spot by which the first optical information recording medium which has a thin transparent substrate and high density, and the second optical information which has a thick transparent substrate and low density, can be recorded and/or reproduced, can also be obtained, in the same manner as described above, on respective information recording surfaces.

In the structure by the coupling lens by which the diverging light emitted from the laser source is converted into converged light, and the converged light limitation type objective lens by which the converged light is converged on the information recording surface, or in also the optical system structured such that the aberration correcting optical element is arranged in the optical path in addition to the structure of the above optical system, a fine light spot by which the first optical information recording medium which has a thin transparent substrate and high density, and the second optical information which has a thick transparent substrate and low density, can be recorded and/or reproduced, can also be obtained on respective information recording surfaces, by a single recording and/or reproducing optical system for the optical information recording medium, in the same manner as described above.

In the optical system structured by the limitation conjugation type objective lens by which the diverging light emitted from the laser source is converged on the information recording surface, or in also the optical system structured such that the aberration correcting optical element is arranged in the optical path in addition to the structure of the above optical system, a fine light spot by which the first optical information recording medium which has a thin transparent substrate and high density, and the second optical information which has a thick transparent substrate and low density, can be recorded and/or reproduced, can also be obtained on respective information recording surfaces, by a single recording and/or reproducing optical system for the optical information recording medium, as described above.

By the structure as described above, the present invention has the following effects.

According to Structure 1 of the present invention, when the transparent substrate is inserted in the optical system, the wavefront aberration is not continuous and has a step, and when the amount of the wavefront aberration on the border portion of the step, having larger numerical aperture NA, is $W_1$, the wavefront aberration on the border portion having smaller numerical aperture NA is $W_2$, and the wavelength is $\lambda$, the optical system satisfies $W_1-W_2=m\lambda-\delta$, $|m|\leq 10$ (m: integer), $0<\delta<0.34\lambda$. Therefore, the optical information recording medium having different transparent substrate thickness can be recorded and/or reproduced by a single recording and/or reproducing optical system for the optical information recording medium, and the recording and/or reproducing optical system for the optical information recording medium which has a simple structure and which is compact, can be provided.

According to Structure 2, in the recording and/or reproducing optical system for the optical information recording medium, described in Structure 1, the $\delta$ further satisfies $0<\delta<0.25\lambda$, and thereby, a better light spot can be obtained.

According to Structure 3, in the recording and/or reproducing optical system for the optical information recording medium, described in Structures 1 or 2, when the numerical aperture of the border portion of the step is NA, the numerical aperture on the side of the optical information recording medium of the objective lens is $NA_1$, the numerical aperture NA is between 0.33 $NA_1$ and 0.84 $NA_1$, and thereby, a better light spot can be obtained.

According to Structure 4, in the recording and/or reproducing optical system for the optical information recording medium, described in Structures 1 or 2, when the numerical aperture of the border portion of the step is NA, the numerical aperture on the side of the optical information recording medium of the objective lens is $NA_1$, the numerical aperture NA is between 0.5 $NA_1$ and 0.67 $NA_1$, and thereby, influence due to wavelength variation of the light source becomes smaller.

According to Structure 5, in any of the recording and/or reproducing optical systems for the optical information recording medium, described in Structures 1 through 4, the optical system is structured by the collimator lens by which the diverging light emitted from the laser source is converted into approximately parallel light, and the infinite conjugation type objective lens by which the parallel light is converged on the information recording surface, and therefore, the optical information recording medium having different transparent substrate thickness can be recorded and/or reproduced by a single recording and/or reproducing optical system using the above-described type of optical system, for the optical information recording medium. Thereby, the recording and/or reproducing optical system for the optical information recording medium which has a simple structure and is compact, can be provided.

According to Structure 6, in the recording and/or reproducing optical system for the optical information recording medium, described in Structure 5, the optical system is structured by an aberration correcting optical element located in the optical path, in addition to the above-described optical system, and therefore, the degree of freedom of the aberration correction becomes larger. Specifically, the degree of freedom of the aberration correction relating to the wavefront aberration becomes larger.

According to Structure 7, in any of the recording and/or reproducing optical systems for the optical information recording medium, described in Structures 1 through 4, the optical system is structured by a coupling lens by which the diverging light emitted from the laser source is converted into converged light, and a converged light limitation type objective lens by which the converged light is converged on the information recording surface, and therefore, the optical information recording medium having different transparent substrate thickness can be recorded and/or reproduced by a single recording and/or reproducing optical system using the above-described type of optical system, for the optical information recording medium. Thereby, the recording and/or reproducing optical system for the optical information recording medium which has a simple structure and is compact, can be provided.

According to Structure 8, in the recording and/or reproducing optical system for the optical information recording medium, described in Structure 7, the optical system is structured by an aberration correcting optical element located in the optical path, in addition to the above described optical system, and therefore, the degree of freedom of the aberration correction becomes larger. Specifically, the degree of freedom of the aberration correction relating to the wavefront aberration becomes larger.

According to Structure 9, in any of the recording and/or reproducing optical systems for the optical information recording medium, described in Structures 1 through 4, the optical system is structured by a limitation conjugation type objective lens by which the diverging light emitted from the laser source is converged on the information recording surface, and therefore, the optical information recording medium having different transparent substrate thickness can be recorded and/or reproduced by a single recording and/or reproducing optical system using the above-described type of optical system, for the optical information recording medium. Thereby, the recording and/or reproducing optical system for the optical information recording medium which has a simple structure and is compact, can be provided.

According to Structure 10, in the recording and/or reproducing optical system for the optical information recording medium, described in Structure 9, the optical system is structured by an aberration correcting optical element located in the optical path, in addition to the above described optical system, and therefore, the degree of freedom of the aberration correction becomes larger. Specifically, the degree of freedom of the aberration correction relating to the wavefront aberration becomes larger.

According to Structure 11, in any of the objective lenses described in Structures 1 through 10, a better light spot can be obtained.

According to Structure 12, an objective lens can be provided, in which the optical information recording medium having difference transparent substrate thickness can be recorded and/or reproduced by a single recording and/or reproducing objective lens for the optical information recording medium.

According to Structure 13, in the objective lens described in Structure 12, a better light spot can be obtained.

According to Structure 14, in the objective lens described in Structures 12 or 13, a better light spot can be obtained.

According to Structure 15, in the objective lens described in Structures 12 or 13, specifically, the influence due to wavelength variation of the light source becomes smaller.

According to Structure 16, in any of the objective lenses described in Structures 12 through 15, the objective lens by which the optical information recording medium, having the different transparent substrate thickness, can be recorded and/or reproduced, can be provided.

According to Structure 17, in any of the objective lenses described in Structures 12 through 15, the objective lens by which the optical information recording medium, having the different transparent substrate thickness, can be recorded and/or reproduced, can be provided.

According to Structure 18, in any of the objective lenses described in Structures 12 through 15, the objective lens by which the optical information recording medium, having the different transparent substrate thickness, can be recorded and/or reproduced, can be provided.

According to Structure 19, in any of the objective lenses described in Structures 12 through 18, a step can be easily provided in the wavefront aberration.

According to Structure 20, in any of the objective lenses described in Structures 12 through 19, a better light spot can be obtained.

What is claimed is:

1. An apparatus for recording or reproducing information on an information recording surface of an optical information recording medium having a transparent substrate, the apparatus comprising:

(a) a laser source for emitting a light beam having a wavelength of λ nm; and (b) an objective lens for converging the light beam emitted from the laser source on the information recording surface of the optical information recording medium through the transparent substrate, wherein when the light beam is converged through the transparent substrate of the optical information recording medium, a wavefront aberration of the objective lens has a curve which has a step at a numerical aperture (NA), and the following conditions are satisfied, $W_1 - W_2 = m\lambda - \delta,$ $0 < \delta < 0.34\lambda$ where $W_1$ represents a wavefront aberration at a point of the step when the curve is traced from a periphery toward an axis of the lens, $W_2$ represents a wavefront aberration at the point of the step when the curve is traced from the axis toward the periphery of the lens, m represents an integer including zero, and $|m| \leq 10$ is satisfied.

2. The apparatus of claim 1, wherein the objective lens satisfies the following condition, $0 < \delta < 0.25\lambda.$ 3. The apparatus of claim 1, wherein the objective lens is satisfied the following condition, $0.33 \text{ NA1} < \text{NA} < 0.84 \text{ NA1}$ where NA1 represents a numerical aperture of the objective lens on a side of the information recording medium of the objective lens, required for obtaining information from the information recording surface of the information recording medium having a 0.6 mm thickness of transparent substrate.

4. The apparatus of claim 3, wherein NA1 is 0.6.

5. The apparatus of claim 3, wherein the objective lens is satisfied the following condition, $0.50 \text{ NA1} < \text{NA} < 0.67 \text{ NA1}.$ 6. The apparatus of claim 1, the objective lens is an infinite conjugation type objective lens.

7. The apparatus of claim 6 further comprising:

a collimator lens for converting a diverging light emitted from the laser source to a substantially parallel light.

8. The apparatus of claim 7 further comprising an aberration correction optical element.

9. The apparatus of claim 1, wherein the objective lens is a converging light finite type objective lens for converging the converging light on the information recording surface.

10. The apparatus of claim 9 further comprising a coupling lens for converting a diverging light emitted from the laser source to a converging light.

11. The apparatus of claim 10 further comprising an aberration correction optical element.

12. The apparatus of claim 1, wherein the thickness of the transparent substrate of the optical information recording medium is 0.6 mm.

13. The apparatus of claim 1, wherein the wavelength λ of the laser source is satisfied the following condition, $635 \text{ nm} < \lambda < 650 \text{ nm}.$ 14. An objective lens for use in an apparatus for recording or reproducing information of an optical information recording medium provided with a laser source having a wavelength of λ nm, for converging a light beam emitted from the laser source onto an information recording surface of the optical information recording medium through a transparent substrate thereof, wherein when the light beam is converged through the transparent substrate of the optical information recording medium, a wavefront aberration of the objective lens has a step at a numerical aperture of NA, and the following conditions are satisfied, $W_1 - W_2 = m\lambda - \delta,$ $0 < \delta < 0.34\lambda$ wherein $W_1$ represents a wavefront aberration at the numerical aperture of NA when the wavefront aberration is traced from a periphery side of the lens toward an axis of the lens, $W_2$ represents a wavefront aberration at the numerical aperture of NA when the wavefront aberration is traced from the axis of the lens toward the periphery side of the lens, m represents an integer including zero, and $|m| \leq 10$ is satisfied.

15. The objective lens of claim 14, the following condition is satisfied, $0 < \delta < 0.34\lambda.$ 16. The objective lens of claim 14, wherein the following condition is satisfied, $0.33 \text{ NA1} < \text{NA} < 0.84 \text{ NA1}$ where NA1 represents a numerical aperture of the objective lens on a side of the information recording medium of the objective lens, required for obtaining information from the information recording surface of the information recording medium having a 0.6 mm thickness of transparent substrate.

17. The objective lens of claim 16, wherein NA1 is 0.6.

18. The objective lens of claim 16, wherein the following condition is satisfied, $$0.50 \; NA1 < NA < 0.67 \; NA1.$$

19. The objective lens of claim 1, the objective lens is an infinite conjugation type objective lens.

20. The objective lens of claim 1, wherein the objective lens is a converging light finite type objective lens for converging the converging light on the information recording surface.

* * * * *